UNITED STATES PATENT OFFICE.

LOUIS N. SAHM, OF NEW YORK, N. Y.

PIGMENT OR FILLER.

1,242,480.  Specification of Letters Patent.  Patented Oct. 9, 1917.

No Drawing.  Application filed February 26, 1916.  Serial No. 80,720.

*To all whom it may concern:*

Be it known that I, LOUIS N. SAHM, a citizen of the United States, and a resident of the borough of Manhattan, city, county, and State of New York, have invented new and useful Pigments or Fillers, well adapted to various uses in the arts—for example, as a filler or loading material for paper, as a color or pigment for use in paints, and as a carrier or intensifier of other coloring matter.

Generally stated, my new composition consists in the combination of tannin bearing extracts with earthy matter, such as ocher, clay, talcum, gypsum, and equivalent materials.

In the preparation of my composition I proceed as follows:

In a suitable vat or container, provided with the requisite quantity of water, I place, for example, 100 pounds of suitable earthy material, such as those above enumerated, and to this I add 20 pounds of tannin bearing extract, either solid or paste extract, or an infusion of tannin bearing leaves, wood or bark, equivalent to the 20 pounds of extract; and in order that the tannin extractive matter may be made more soluble, I prefer to add to the contents of the vat or container a suitable alkaline substance, for example, 5 pounds of soda ash (sodium silicate, borax, or preferably caustic soda, and even caustic potash or caustic ammonia may be used). To form the precipitate, I also add say 10 pounds of good quality commercial alum, although suitable salts of copper, iron, zinc, barium, calcium and magnesium may also be used.

These materials are all thoroughly mixed together, preferably by a suitable mechanical mixer. They are then allowed to stand until precipitation takes place, whereupon the supernatant liquor is drawn off. Any preferred apparatus other than the vat and stirrer may be used. The precipitate is my new product and it may be used in semi-liquid or paste form or may be dried and powdered.

A small quantity of an oxidizing agent, say one quarter to one half pound, such as bichromate of potash or soda, may be added prior to the cessation of the mixing process, or immediately thereafter, to complete precipitation and develop the color.

My new composition is in convenient form for use in the industries mentioned, and being a mordant for basic anilin dye, is a carrier of other coloring matter. The extract matter has a little adhesive or binding power and together with the tannin makes the unusually large quantity of clay or other earthy matter more easily retained by the fibers in dyeing paper pulp.

The admixture of a suitable amount of this material makes the use of basic coloring matter more satisfactory because tending to increase its fastness to light to such an extent that relatively inexpensive coloring matter will frequently compare favorably with more expensive dyes that have heretofore been used because of their better fastness to light.

The readily adhesive nature of the composition is advantageous when used in the printing and painting arts, for fresco work and the like, as it reduces the quantity of glue or equivalent binder otherwise requisite.

The tannin bearing extracts which I prefer are made from logwood, quercitron, sumac, walnut, chestnut, hemlock, quebracho and similar woods.

The proportions given above for blending the composition are not arbitrary, although I have found them useful. They may be altered to suit requirements. Also any suitable basic color may be added to the composition to enhance its value as a coloring matter.

I claim:

A pigment or filler containing tannin bearing extract, earthy matter, an alkaline substance, a metallic salt to induce precipitation, and an oxidizing agent.

In testimony whereof I have signed my name to this specification.

LOUIS N. SAHM.